United States Patent
Zakoshansky et al.

(10) Patent No.: US 8,558,031 B2
(45) Date of Patent: Oct. 15, 2013

(54) METHOD FOR HIGH EFFICIENCY SALT REMOVAL FROM PHENOL PROCESS BYPRODUCTS

(75) Inventors: Vladimir Mikhailovitch Zakoshansky, Long Grove, IL (US); Irina Ivanovna Vassilieva, St. Petersburg (RU)

(73) Assignee: Illa International L.L.C., Reno, NV (US)

( * ) Notice: Subject to any disclaimer, the term of this patent is extended or adjusted under 35 U.S.C. 154(b) by 0 days.

(21) Appl. No.: 11/123,637

(22) Filed: May 6, 2005

(65) Prior Publication Data

US 2006/0252975 A1    Nov. 9, 2006

(51) Int. Cl.
*C07C 37/68*    (2006.01)

(52) U.S. Cl.
USPC .......................................................... 568/749

(58) Field of Classification Search
USPC .......................................................... 568/749
See application file for complete search history.

(56) References Cited

U.S. PATENT DOCUMENTS

| 5,283,376 | A | 2/1994 | Dyckman et al. |
| 6,034,282 | A | 3/2000 | Dyckman et al. |
| 6,057,483 | A | 5/2000 | Zakoshansky et al. |
| 6,225,513 | B1 | 5/2001 | Zakoshansky et al. |
| 6,489,518 | B1 * | 12/2002 | Weber et al. .................. 568/749 |
| 6,720,461 | B2 * | 4/2004 | Taggart, II et al. ........... 568/754 |

FOREIGN PATENT DOCUMENTS

RU    20577467 C1    4/1996

* cited by examiner

*Primary Examiner* — Johann R Richter
*Assistant Examiner* — Jennifer C Sawyer
(74) *Attorney, Agent, or Firm* — Cantor Colburn LLP (57) ABSTRACT

A desalting method for extracting salt from phenol production waste of a phenol process, comprising the steps of:
(a) receiving said phenol production waste from the phenol process;
(b) providing a parting agent operable to separate, on contact, an organic material into an organic phase and an aqueous phase;
(c) providing an extractant operable, on contact, to absorb salt into an aqueous phase, wherein said extractant comprises an aqueous $NaHSO_4$ solution;
(d) performing at least one sequential extraction step, in at least one corresponding sequential extraction system, on said phenol production waste, to extract salt therefrom.

33 Claims, 3 Drawing Sheets

METHOD FOR HIGH EFFICIENCY SALT REMOVAL FROM PHENOL PROCESS BYPRODUCTS

FIELD OF INVENTION

The present invention is directed to treatment of byproducts resulting from a phenol process, and in particular, to a method for removing salt from phenol process byproducts.

BACKGROUND OF INVENTION

The processes of cumene oxidation to cumene hydroperoxide (CHP) and subsequent acid-catalyzed (by sulfuric acid) CHP cleavage give rise to target products such as phenol and acetone, a valuable byproduct, such as alpha-methylstyrene (AMS), and also undesirable waste products. In such processes, salts of mostly sodium composition, such as sodium sulfate and sodium bisulfate, as well as salts of organic acids, mainly of formic, acetic, propionic, and benzoic acids, are carried over to the CHP cleavage products during neutralization of the acid catalyst. The presence of such salts in the CHP cleavage products conveyed to a downstream stage of target product fractionation causes a number of serious problems, such as clogging of heat exchange equipment, increased utilization of steam, and most importantly, significantly complicates the processing of undesirable phenol waste products.

The phenol process waste products can be divided into two types:
1. Byproducts formed during a stage of technical grade CHP cleavage, which are collectively called "phenol tars"; and
2. Byproducts formed in preparation and separation of cumene during a stage of AMS hydrogenation to cumene, or during a stage of target AMS production, which are collectively called "aromatic tars".

Phenol tars are typically mixtures of various compounds, for example, including, but not limited to:
Products of phenol condensation with dimethyl benzene alcohol (DMBA) such as ortho-, metha-, and para-cumylphenols;
Products of DMBA condensation to AMS dimers of three species (dimer 1, dimer 2, and dimmer 3);
Polyphenols;
Acetophenone;
Phenol;
DMBA and AMS;
ortho-cumyl ether and other products of deep condensation of phenol; and
$Na_2SO_4$.

Aromatic tars are most commonly represented by cumene, AMS, and AMS polycondensation products, such as trimers and n-mers of AMS. Wastes of this type are typically formed in processing of a hydrocarbon fraction rich in cumene and AMS, which is fed either to an AMS hydrogenation system, or to a target AMS production system. The hydrocarbon fraction is previously washed thoroughly with an aqueous caustic solution to separate it from phenol. As a result of such hydrocarbon fraction processing, sodium phenate concentrates in the waste products.

The wastes from an AMS hydrogenation stage commonly contain about 10 wt. % cumene, about 40 wt. % AMS, about 10 wt. % butylbenzenes, and the remaining balance consisting of mesityl oxide, phorone, and AMS condensation products.

The wastes from a target AMS production stage commonly consist of about 70-80 wt. % AMS, about 1-2 wt. % butylbenzenes, and the remaining balance (about 20-30 wt. %) consisting of AMS polycondensation products.

It should be noted that aromatic tars may or may not contain salts depending on the type and configuration of processing technology applied to the AMS-containing fraction.

The quantity and composition of phenol process wastes (hereinafter referred to as "PPW") are to a great extent determined by the selectivity of technologies used at critical process stages. For example, when the highly selective technologies as disclosed in the commonly assigned U.S. Pat. Nos. 6,057,483 and 6,225,513 are utilized, the PPW amounts to 30 kg to 40 kg per ton of phenol, but most of currently existing plants utilizing other process technologies report from 80 kg to even 200 kg of PPW per ton of phenol. This is the reason why processing of the PPW is of great practical importance. However, it is practically impossible to process the PPW (including incineration to yield steam), without can first effectively removing mineral salts (such as $Na_2SO_4$) from the PPW, where these salts may range in quantity from 0.1 wt. % to 4 wt. %.

It should be noted that all previously known desalting methodologies, such as disclosed in Russian Pat. No 20577467; U.S. Pat. No. 5,283,376; and U.S. Pat. No. 6,034,282, have only been intended to salt removal from the byproducts of CHP cleavage, (i.e. phenol tar) that are free from aromatic tars (that greatly complicate salt removal).

One previously known commercial approach proposes treatment of phenol tar with 10% sulfuric acid solution at a volumetric ratio of 1:0.5 for a period of sixty minutes. After the treatment period ends, the solution is left to settle for two hours and then the desalted tar containing residues of sulfuric acid flows to a stage of washing (by water) to remove the acid. The washing occurs for thirty minutes and the tar is then subjected to a settling period of three hours. As a result this process is very inefficient and costly. Although, this method is capable of achieving a relatively good desalting degree of 85-90% relative, the use of sulfuric acid results in a number of irresolvable technical problems:

First, sulfuric acid promotes a number of chemical reactions of continued condensation that make the materials very viscous and difficult to handle (in terms of transporting or delivery);

Second, sulfuric acid directly reacts with phenol and phenolics to form various species of phenolsulfonic acids, which cannot practically be washed out by water. As a result, the use of a cracker in the process would abruptly reduce the yield of desirable valuable products, while tar incineration would result in an impermissible release of environmentally harmful compounds, such as $SO_2$ and $SO_3$, in combustion gases; and Third, the phenol tar must be washed from $H_2SO_4$ and phenolsulfonic acids simultaneously—this is an unsolvable dilemma.

Accordingly, the above-described proposed desalting method has not achieved commercial use, and those who attempted to employ it, inevitably rejected it.

U.S. Pat. No. 5,283,376 proposed phenol tar treatment with an aqueous ammonia solution for simultaneous dephenolation and desalting of phenol tar. However, the use of aqueous ammonia (or amine derivative) solution causes a number of serious problems during operation of this technology, indicated below:

The waste water from a phenol plant utilizing the '376 process would contain a very large concentration of nitrogen compounds, which are impermissible by commonly accepted environmental regulations;

Combustion of phenol tar that contains ammonia or its derivatives leads to formation of nitrous oxides in exhaust gases, which creates another serious environmental concern;

Addition of ammonia or amine derivatives to the desalting unit, increases the pH values of the organic and aqueous phases, which results in an essentially non-demulsifiable emulsion, because a third phase is created between the organic and aqueous phases; and Cracking of phenol tar that has even a small concentration of ammonia or its derivatives, greatly decreases the yield of desirable valuable products.

All of the above problems, individually and in conjunction with one another, result in the '376 technology being unfeasible and impractical to implement. Accordingly, for the reasons above, ammonia (amine derivatives) desalting methods based on ammonia (amine derivatives) has not found and has not obtained, and will hardly ever obtain, commercial use.

Referring now to U.S. Pat. No. 6,034,282, a process for desalting of phenol tar by water is disclosed. The '282 process, proposed that an emulsion which formed from water contacting with phenol tar is mixed using commonly known mechanical mixing techniques such as utilization of a rotating anchor stirrer, rotating paddles, reciprocating trays, or a pulsing column. However, it is well known in the industry that such mechanical devices cannot be practically utilized for working with materials of such high viscosity as phenol tar. For this reason, all attempts to overcome the desalting challenge by purely mechanical means by utilization of the mechanical mixing devices have met with failure and were never successfully commercially implemented.

One approach that has achieved some commercial success is disclosed in the commonly assigned Russian Pat. No 20577467. The '467 patent discloses a method of contacting phenol tar with water and diisopropyl ether ("DIPE") to overcome the desalting problem. This method achieves a very high desalting degree of 85% to 95%, depending on the salt content in the phenol tar. The approach disclosed in the '467 patent is used successfully in commercial practice, where a three-step extraction system reduces salts in the phenol tar from 2.5 wt. % to 20 ppm. However, this method also has certain drawbacks:

DIPE can form explosive and flammable mixtures due to its tendency to form peroxides;

DIPE's very low boiling point and high volatility, handicap its condensation for the purpose of recycling, which accordingly results in significant material losses; and DIPE's entry into recycle streams of main process materials negatively impacts the quality of the acetone product.

It would thus be desirable to provide an efficient, stable, and environmentally safe process for removing salts from byproducts (wastes) from a phenol production process.

SUMMARY OF THE INVENTION

The object of the present invention is to provide an efficient, stable, and environmentally safe process for removing salts from byproducts (wastes) from a phenol production process. As an example, one purpose of the present invention is creation of a technique for continuous desalting of byproducts from a phenol production process, to produce an effluent containing less than about 100 wt. ppm of mineral salts (e.g., mostly $Na_2SO_4$. The inventive desalting method employs the following novel characteristics, techniques, steps, and compositions:

Utilization, as a feed, of either phenol tar, or a mixture of phenol tar and aromatic tars, collectively referred to as the phenol production wastes (hereinafter "PPW");

Addition of a specially selected type of parting agent ("PA") with desalting capability, and that is PPW-soluble, but insoluble in an aqueous, or an aqueous salt medium;

Utilization of an aromatic material such as benzene, ethylbenzene, cumene, AMS, their mixtures, or an aliphatic, unsaturated, or cyclic aliphatic hydrocarbon, as a "salting-out" parting agent, where all types of parting agents have a boiling point of no higher than 180° C., to ensure ready separation of an organic phase from an aqueous phase; and Combined utilization of a parting agent and a salt-extracting agent (hereinafter "extractant") fed to an extraction unit, where the extractant may be water, or, alternately, an aqueous solution holding $Na_2SO_4$ and/or $NaHSO_4$ at a set mass ratio;

The inventive process, also achieves additional purposes such as control over the extraction process and salt content by maintaining pH less that 7 in the aqueous or aqueous salt phases and minimization of the quantity of waste water from the phenol production process, which is advantageously achieved by recycling the aqueous, or aqueous salt phase, to the desalting unit, followed by routing the aqueous salt phase to an existing neutralization unit operated within the phenol production system.

In summary, the novel desalting process of the present invention, includes at least a portion of the following distinctive features that are in contrast with previously attempted solutions:

1. The PPW to be desalted may be any compounds formed during a technical grade cumene hydroperoxide cleavage stage (i.e., phenol tar) and/or by aromatic derivatives formed during an alpha-methylstyrene hydrogenation stage, or during a target AMS production stage, and/or any mixture thereof;

2. The parting agent may be selected from various types of hydrocarbons, including aromatic, aliphatic, or cyclic hydrocarbons having a boiling point of about 180° C. or lower;

3. The pH value of the aqueous or aqueous salt phase is maintained within the range of 1 to below 7;

4. The mass ratio of the PPW to the aqueous or aqueous salt phase to the parting agent is maintained within the range of about 1:0.1:0.05 to about 1:2:1.5;

5. Extraction of salt may be performed through one of more extraction steps. To achieve a higher degree of desalting, in the case where more than one extraction step is utilized, the last extraction step may comprise a complete washing of PPW with fresh salt-free water, i.e., without aqueous salt phase circulation, at a mass ratio of water to the combination of phenol tar and parting agent of about 0.01:1 to about 0.5:1;

6. When more than one extraction step is used, the aqueous salt phase is continuously recirculated at all extraction steps, except the last extraction step when a higher desalting degree is required;

7. The total salt concentration in the aqueous salt phase does not exceed the limit of salt solubility in water for the extraction temperature employed; and 8. The spent aqueous salt phase is sent to an acid catalyst neutralization unit (for example, to an existing unit in the phenol process).

The method of the present invention advantageously provides the ability to output phenol production wastes that contain less than 100 ppm and even as low as 1 ppm salts (e.g., $Na_2SO_4$), at minimum water makeup, with recirculation of the aqueous salt phase to the CHP cleavage product neutralization area to reduce the waste water from the phenol production process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views.

DETAILED DESCRIPTION

Before describing the present invention in greater detail, it should be noted that the various embodiments of the desalting process of the present invention may be advantageously and readily utilized in conjunction with virtually any phenol process regardless of the oxidation and cleavage technologies used. It should also be noted that the various parting agents specifically mentioned below are noted by way of example—other alternate parting agents may be utilized without departing from the spirit of the invention, as a matter of design choice, as long as such alternate parting agents have the specific necessary properties as described below (e.g., being PPW-soluble, but insoluble in an aqueous, or an aqueous salt medium; having a boiling point below 180° C., etc.).

Figure 1:
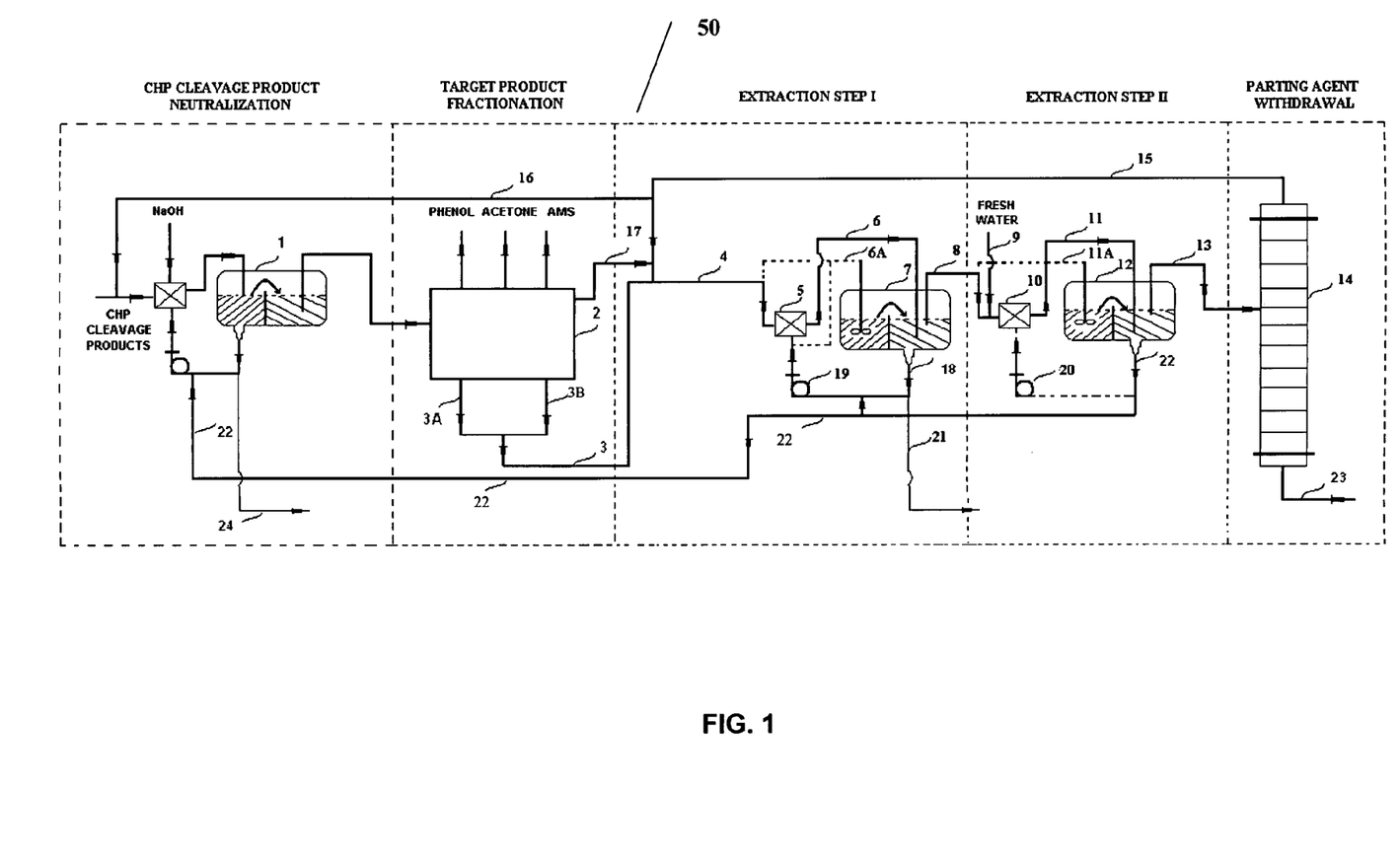
FIG. 1 is a schematic process flow diagram of a first embodiment of the inventive continuous PPW desalting process utilizing a series of mixing-settling extraction steps, with cumene being utilized as a parting agent by way of example.

Referring now to FIG. 1, a block process flow diagram of a first exemplary embodiment of the inventive continuous PPW desalting process, is shown as a novel desalting process 50. The desalting process 50 achieves continuous desalting of PPW received from a phenol process, through stepwise extraction, and is shown, by way of example, with two extraction steps (Step I and Step II). While two extraction steps are shown in FIG. 1, it should be noted that one or more sequential extraction steps can be used, without departing from the spirit of the invention, with the optimal number of extraction steps being dependent on one ore more of the following factors (1) the salt content in the initial PPW received from the phenol process, the specific requirements of maximum permissible salt concentration in the desalted PPW (PPW stream 23), the PPW to extractant to parting agent mass ratio, the salt content in, the extractant, and the operational efficiency of each extraction step.

At each extraction Step I and II, a mixing/settling system (i.e. extractor 7 for Step I, and extractor 12 for Step II) is provided that is capable of bringing immiscible phases into effective contact with one another (for increasing mass transfer between the phases) that results in layering and separation of the phases in a settler. Any device or group of devices capable of achieving the above objective may be used, such as a mixing-settling extractor or a static mixer or equivalent mixing device with a separate settling unit installed sequentially, as is shown in FIG. 1. The extraction and phase separation process is preferably carried out at about 5° C. to about 95° C. Conducting the process at a lower temperature is practically impossible as the viscosity of PPW dramatically increases at temperatures below 5° C. greatly lowering process efficiency and risking damage to equipment, while at temperatures exceeding about 95° C. the process simply does not work properly.

The PPW, which comprise technical grade CHP cleavage products (phenol tar) 3A and/or aromatic derivatives 3B from an AMS hydrogenation stage (or a target AMS production stage), or a mixture 3 of streams 3A and 3B, flow to the first extraction step extractor 7. A parting agent 15 is supplied to the extraction Step I from a column 14 top, and is continuously recirculated through the column 14 where the parting agent is separated from the PPW by distillation. The parting agent is preferably selected such that it has desalting capability, and such that it is PPW-soluble, but insoluble in an aqueous, or in an aqueous salt medium. For example, aromatic substances such as benzene, ethylbenzene, cumene, AMS, their mixtures, or aliphatic, unsaturated, or cyclic aliphatic hydrocarbons, may readily be used as a "salting-out" parting agent, as long as the substance selected for use as a parting agent has a boiling point of no higher than 180° C., to ensure ready separation of an organic phase from an aqueous phase during the desalting process. It should be noted that when cumene is used as a parting agent, it can not only be separated from the PPW by distillation, but also can be supplied from a target product fractionation stage (i.e., via a stream 17). In this case, the column 14 overheads 15 flows to a neutralization unit 1 via line 16.

The PPW, the parting agent and a salt-extracting agent ("extractant") are directed to the extractor 7 of the extraction Step I. The extractant may be water, or alternately, an aqueous salt phase (for example holding $Na_2SO_4$ and/or $NaHSO_4$ at a set mass ratio).

The organics, i.e. the mixture of PPW and the parting agent, and the extractant, may first be mixed in a mixer 5 before proceeding to the extractor 7, or, optionally, they may be directed to a mixing section of the extractor 7, and after mixing, the mixture of organic and aqueous salt phases may be directed either to a separate settler, or to a settling section of the extractor 7, where the immiscible phases are separated. The organic phase from extractor 7 then flows (via stream 8) to the extraction Step II, while the aqueous salt phase from the extractor 7 bottom is recycled (via stream 18) by a pump 19. To ensure proper mixing in pump 19, mixer 5, or in the mixing portion of the extractor 7, the PPW to aqueous salt phase mass ratio should be set from about 1:0.1 to about 1:2.

During the extraction steps, It is important to maintain the pH of the aqueous phase (or aqueous salt phase if it is utilized), above about 0.8 but below 7. At a pH of 7 or above, a third phase forms that contains sodium phenate, and that intermixes with the other phases making their separation very difficult or impossible (for a high pH). On the other hand, a pH of lower than 0.8 involves the presence of free sulfuric acid which causes additional undesirable chemical reactions. This is discussed in greater detail below in connection with Tables 1 and 2.

To maintain pH<7 for the aqueous (salt) phase, sulfuric acid is added thereto in an amount that is sufficient for $NaHSO_4$ formation but that eliminates undesirable free sulfuric acid therein. A portion of a circulating aqueous salt phase (via stream 21) is directed to the neutralization stage (not shown), or purged to chemically contaminated drains. An aqueous (salt) phase from the second extraction step (stream 22), or a portion thereof, is added to the stream 18 to replenish water carried away with the PPW and the parting agent. Fresh water 9 is added to the organic stream 8 prior to entering the extraction Step II. Similarly as described above, a mixer 10 may optionally be used prior to proceeding to the extractor 12.

From the extractor 12 bottom, an aqueous salt stream 22 containing a small amount of salts is recycled by a pump 20 to the extraction Step II, or, optionally, a part of stream 22 flows as makeup to the extraction Step I via the pump 19, while another part flows to the neutralization unit 1. From a settling section of extractor 12, the PPW along with the PA (stream 13) flow to distillation column 14, which separates the PA (stream 15) from the PPW (stream 23).

At all extraction Steps 1 and 11, the PPW to PA mass ratio should be kept to about 1:0.03 to about 1:2, and preferably to about 1:0.5, while the PPW to PA to aqueous or aqueous salt phase mass ratio should be kept to about 1:0.5:0.5.

The novel and advantageous use of an aqueous $NaHSO_4$ solution as a desalting solution is not accidental, but is based on our research. In addition, our research resulted in the discovery of the following unexpected and a priori unpredictable facts, which are important in successfully implementing the inventive process 50:

1. While the aqueous sodium sulfate solution is very effective for PPW desalting at the extraction Step I, aqueous solutions of sodium sulfate and sodium bisulfate are likewise effective.
2. An aqueous salt solution containing acidic salt $NaHSO_4$, is more effective for PPW desalting than an aqueous salt solution containing neutral salt $Na_2SO_4$.
3. Keeping the aqueous salt phase at pH<7 prevents the formation of emulsion and an undesirable third phase that makes the phase separation portion of extraction inoperative.
4. The preferable pH of the aqueous salt phase is 0.1 to 5.5. Within this pH range, the separation of organic and aqueous salt phases proceeds much more quickly and effectively in terms of PPW desalting.
5. An aqueous salt solution that contains $NaHSO_4$ layers much more quickly. This results in the ability to utilize smaller settlers or settling sections of the extractors (7, 12).

The above-mentioned advantageous facts are proven by the data shown in Tables 1 and 2, below. According to our research, the formation of emulsion and the third phase, which makes PPW desalting inoperative, is caused by the presence of sodium phenate in the PPW, which is relevant to all phenol technologies. The formation of emulsion and the third phase occurs when water is used as an extractant and a pH≥7 is maintained. A decreased pH value leads to sodium phenate deoxidation, which eliminates both the formation of emulsion (that complicates the salt extraction process) and also eliminates the formation of the third phase (that makes the phase separation process virtually inoperable). If the undesirable third phase was to be produced, it would require separate processing.

The use of lower pH values at the extraction Step I of the inventive process makes it possible to use water for washing at the subsequent extraction step(s) due to the so-called sodium phenate deoxidation. It is also possible to use water at the first extraction step, but only when pH of significantly less than 7 is maintained, which may be achieved through addition of sulfuric acid to the aqueous phase. However, according to our research, the presence of free sulfuric acid in the aqueous salt phase is undoubtedly undesirable since sulfuric acid partially moves into organic phase and leads to various polycondensation reactions which make it very difficult to transport the PPW due to significantly increased viscosity. To achieve the lower pH value and simultaneously eliminate the mentioned adverse impact of sulfuric acid, preferably, $H_2SO_4$ is fed into the aqueous phase containing $Na_2SO_4$ in an amount sufficient to convert all or a portion of $Na_2SO_4$ into acidic salt, i.e. sodium bisulfate ($NaHSO_4$).

The advantage of $NaHSO_4$ over $Na_2SO_4$ is proved by the data shown in an exemplary Table 1, as an example of three-step extraction with the same parting agent (cumene) and $Na_2SO_4$ and $NaHSO_4$ concentrations in the aqueous salt phase. This data proves that the $Na^+$ concentration in the extraction products using $NaHSO_4$ is almost twice lower than when $Na_2SO_4$ is used.

TABLE 1

PPW Desalting Degree (Example)
Extractant - Aqueous Salt Phase Containing $Na_2SO_4$ and $NaHSO_4$.
Parting Agent - Cumene. Three-Step Extraction.

| Test Run | $Na_2SO_4$ Concentration in PPW, wt % | PPW to PA to Extractant Mass Ratio | | | $Na_2SO_4$ Concentration in Extractant, wt % | $NaHSO_4$ Concentration in Extractant, wt % | $Na^+$ Concentration in PPW after $3^{rd}$ Step, ppm |
|---|---|---|---|---|---|---|---|
| | | PPW | PA | Extractant | | | |
| 1 | 1.0 | 1 | 1 | 1 | 10 | 0 | 148.0 |

The use of $NaHSO_4$ makes it possible to use water as extractant at a third extraction step (not shown), which additionally reduces the salt concentration in the PPW (Table 2, Test Run 1), or the number of extraction steps (Table 2, Test Run 2).

TABLE 2

PPW Desalting Degree (Example)
Extractant - Aqueous Salt Phase Containing $NaHSO_4$.
Parting Agent - Cumene.

| Test Run | $Na_2SO_4$ Concentration in PPW, wt % | PPW to PA to Extractant Mass Ratio | | | Number of Extraction Steps | $NaHSO_4$ Concentration in Extractant, wt % | $Na^+$ Concentration in PPW after $3^{rd}$ Step, ppm |
|---|---|---|---|---|---|---|---|
| | | PPW | PA | Extractant | | | |
| 1 | 1.0 | 1 | 1 | 1 | 3 | 10 | 2 |
| 2 | 1.0 | 1 | 1 | 1 | 2 | 10 | 13 |

The reduction in the $Na_2SO_4$ concentration to a practical value of 0.3 to 0.4 wt %, when a coalescer is used after the neutralization stage and the extractant contains $NaHSO_4$, makes it possible to reach a $Na^+$ concentration in the PPW of 30 ppm after the second extraction step and less than 3 ppm in the three-step case. Such a high PPW desalting degree allows using much more effective catalytic methods of PPW treatment instead of traditional thermal ones.

Figure 3:
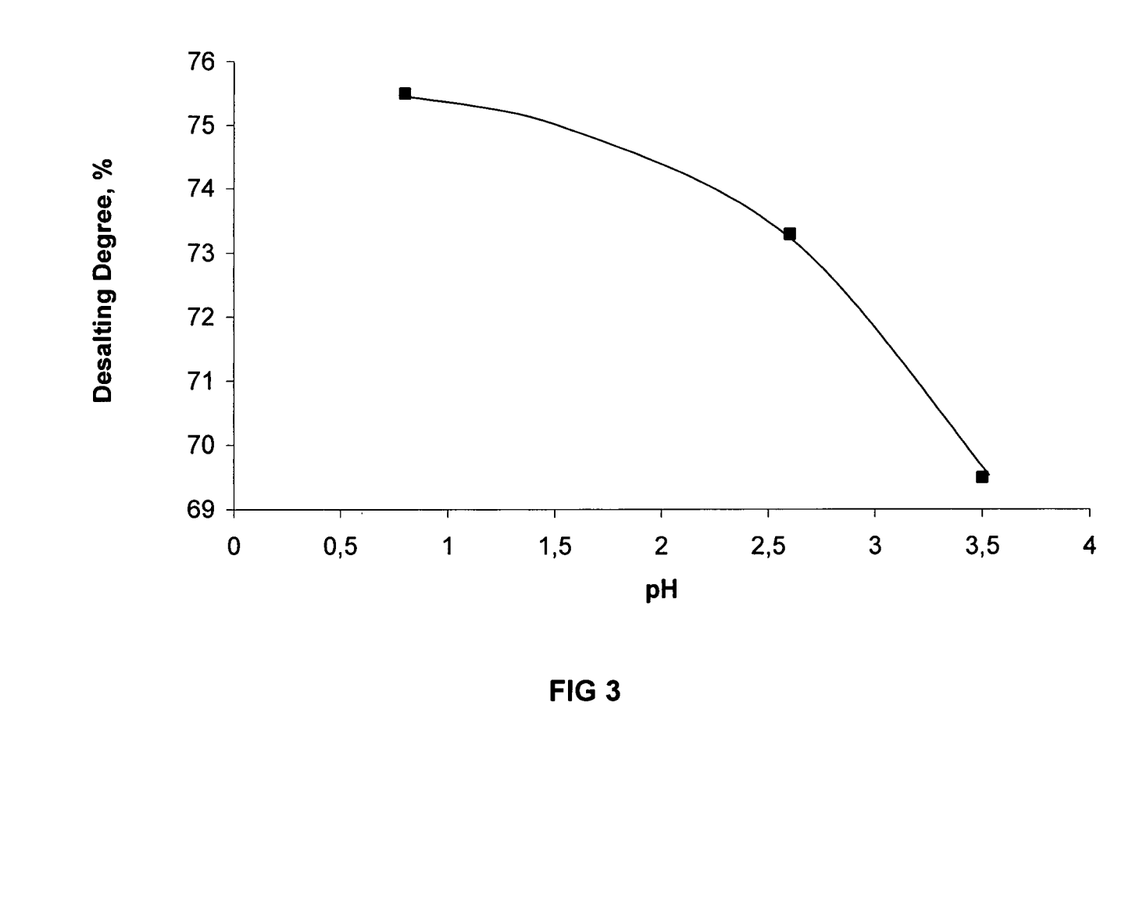
FIG. 3 is an exemplary graph showing the level of PPW desalting as a function of a pH value of an aqueous salt phase utilized as part of the inventive process of FIGS. 1 and 2.

The specific optimal $NaHSO_4$ concentration for the given method of PPW desalting is pre-determined by both the pH value of the aqueous salt phase and the velocity (time) of layering of the aqueous salt phase and the PA-containing PPW. Our research revealed a non-evident and unpredictable fact that a decrease in pH value increases the PPW desalting degree and the layering time of the mentioned phases as is shown in a graph of FIG. 3.

The novel features of the present invention discussed above allow flexible control of both the extraction process and the separation of the aqueous salt and organic phases and make it possible to minimize the sizes of the extractor and the settler. None of the previously known desalting methods can perform these tasks since the previously used extractants have a constant pH value which is determined by the phenol dissolved in the extractant during the extraction process, and the phenol solubility is a constant (0.6 wt. %). When aqueous ammonia solution is used as an extractant, the pH value is more than 7 (which determines a low desalting degree) and ammonia does not form ammonium phenate; therefore, it is essentially impossible to remove phenol from phenol tar which would help reach lower and more effective pH values in the process (U.S. Pat. No. 5,283,376). The reason for the fact that it is impossible to convert phenol into ammonium phenate is small pH values of phenol and $NH_4OH$ and that weak acids (phenol) and weak bases ($NH_4OH$) do not form salts (in this case, ammonium phenate).

In stark contrast to previously known desalting methods, the novel salt extraction method of the present invention that utilizes an aqueous salt phase at lower pH values, does not have the above-described inherent drawbacks, and further enables:

control of the desalting degree, by monitoring/control of the pH value, and feeding phenol tar or PPW having an increased sodium phenate concentration (which is characteristic of a number of commercial plants) to the desalting area while effectively removing salts from these products.

For the above reasons, in accordance with the present invention, the preferred salt concentration in the aqueous salt phase is about 5 wt. % to about 10 wt. %. The pH value varies from 0.6 to 3.5 according to the sodium phenate concentration in the phenol tar and PPW. The higher sodium phenate concentration, the lower pH value of the aqueous salt phase is maintained in the process. One of the goals in controlling the pH value is to ensure a sodium ion content in the PPW ranging from about 1 ppm to about 500 ppm as adjusted by the number of extraction steps utilized.

When cumene, or a mixture of cumene and AMS, is used as a parting agent, the cumene to AMS mass ratio can significantly vary, i.e. it can be pure cumene or pure AMS or their mixtures (hydrocarbon fraction—HF) in all proportions. The cumene to AMS mass ratio is determined by the density difference between the aqueous salt phase and PPW—parting agent mixture, which is required for effective extraction, the temperature profile in a parting agent distillation column 14, the number of trays in the column and the reflux ratio. When HF is used, the so-called internal cumene recycle is used for PPW desalting with zero cumene flow from outside. However, in this case (not shown in FIG. 1) a portion of the HF recycle is directed either to the neutralization section, or to the target product fractionation section, to eliminate the buildup of phenol, acetophenone, and other products, including impurities, such as phorone and cresols, in the HF recycle. As a result, the entire phenol process has better usage values, i.e., cumene usage per ton of phenol, and the total yield of PPW is reduced by 10 to 20% relative, which is an important advantage of the novel PPW desalting method of the present invention over any previously known methods of PPW desalting.

Figure 2:
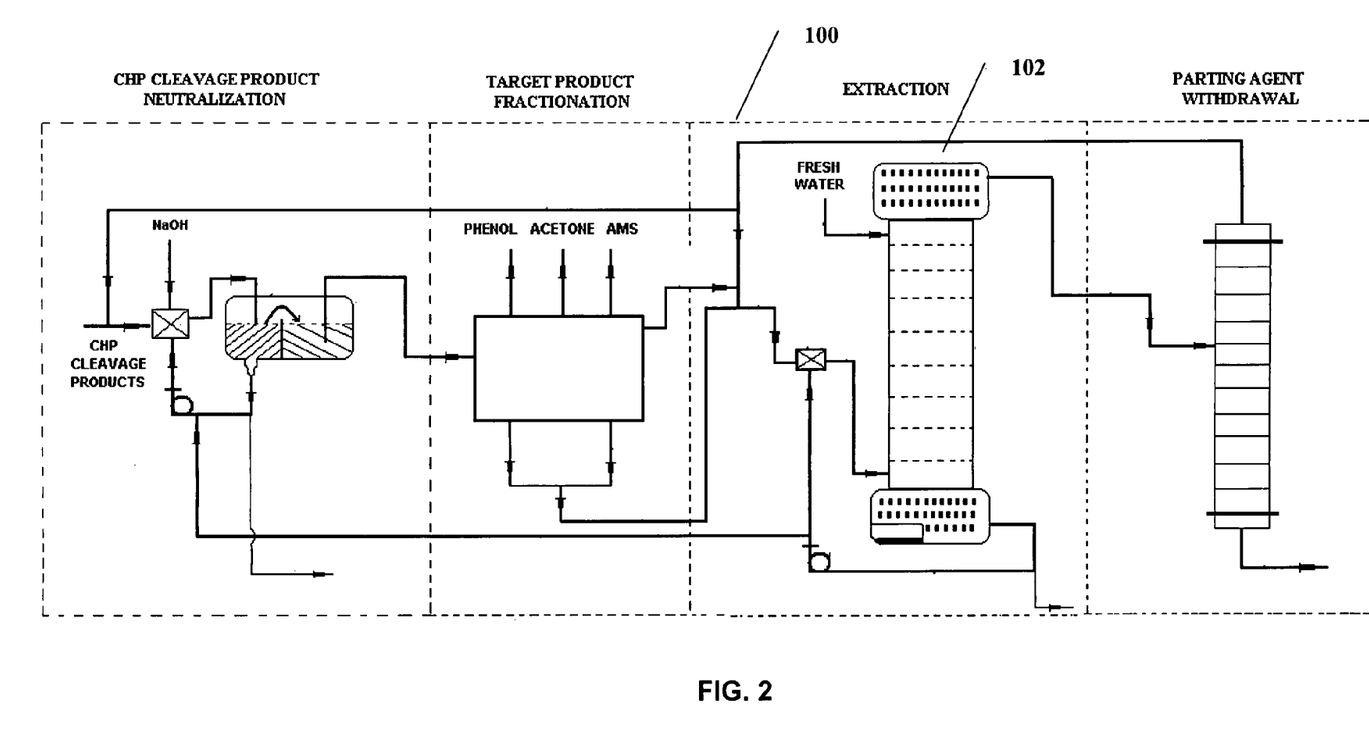
FIG. 2 is a schematic process flow diagram of a second embodiment of the inventive continuous PPW desalting process utilizing a countercurrent extraction column, with cumene being utilized as a parting agent by way of example.

Referring now to FIG. 2, a block process flow diagram of a second exemplary embodiment of the inventive continuous PPW desalting process, is shown as a novel desalting process 100. The desalting process 100 achieves continuous desalting of PPW received from a phenol process, through a counter-current extraction column 102 that essentially functions as one or more extraction steps described above in connection with FIG. 1. In all other aspects, it is based on the same principles of PPW desalting as the process described above.

The above-described advantages and distinctions of the inventive process for desalting PPW are illustrated by experimental result Examples 1-9, and comparative Example 10, below. It should be noted that the below described examples are presented for illustrative purposes only and are not intended to limit the scope of the present invention.

Example 1

The PPW comprising a byproduct of technical grade cumene hydroperoxide cleavage, i.e. phenol tar which contained 0.1 wt. % cumene, 0.18 wt. % α-methylstyrene, 7.03 wt. % phenol, 24.27 wt. % acetophenone, 6.25 wt. % dimethyl benzene alcohol (DMBA), 32.00 wt. % ortho- and para-cumylphenol, 11.87 wt. % AMS dimers, 9.54 wt. % unknown components, and 8.81 wt. % heavy condensation products, and having a salt content of 0.38 wt. % (the salt content based on sodium was 0.123 wt. %), were directed to the desalting area consisting of two extraction steps. A mixer was used for mixing of the phases and a settler for their layering. The extraction was conducted at 60° C. Cumene was used as a parting agent. Phenol tar, cumene, and an aqueous salt phase containing 2.5 wt. % sodium sulfate and 0.9 wt. % phenol, were mixed in the mixer at a mass ratio of 1:1:1, respectively. The pH of the aqueous salt phase was 6.0. After agitating violently in the mixer, the resulting mixture was left in a settler for complete layering and then passed to the second extraction step, which was similar to the first step. Each step comprised separation into a cumene-tar phase and an aqueous salt phase. The aqueous salt fraction was removed from the process. Cumene was taken off under vacuum from the cumene-tar fraction. The cumene-free phenol tar then contained 0.0182 wt. % salt (or 59 ppm based on sodium). The salt content in the tar was analyzed by incineration method while gradually heating up to 800° C.

The described desalting process consisting of two extraction steps resulted in a desalting degree of 95.3%.

This desalting degree was calculated by the formula:

$$\varepsilon = \frac{[\text{salt}]^{initial\ tar} - [\text{salt}]^{desalted\ tar}}{[\text{salt}]^{initial\ tar}},$$

where:
$[\text{salt}]^{initial\ tar}$ is the salt concentration in the initial phenol tar; and
$[\text{salt}]^{desalted\ tar}$ is the salt concentration in the desalted phenol tar.

Example 2

The process was conducted in the same manner as in Example 1, except that the PPW comprised a combination of phenol tar and the products of target AMS production stage, which contained 0.5 wt. % cumene, 8.7 wt. % AMS, 8.30 wt. % phenol, 18.80 wt. % acetophenone, 4.75 wt. % DMBA, 25.80 wt. % ortho- and para-cumylphenol, 8.35 wt. % AMS dimers, 11.82 wt. % unknown, and 12.98 wt. % heavy condensation products, and having a salt content of 0.32 wt. % (the salt content based on sodium was 0.104 wt. %). Upon the extraction and cumene take-off, the PPW contained 0.0128 wt. % salt (or 0.0041 wt. % based on sodium).

The described desalting process consisting of two extraction steps resulted in a desalting degree of 96.0%.

Example 3

The process was conducted in the same manner as in Example 2, except that the aqueous salt phase contained 2.5 wt. % sodium sulfate, 0.0050 wt. % sodium bisulfate, and 0.86 wt. % phenol, and had a pH value of 5.0. Upon the extraction and cumene take-off, the PPW contained 0.0106 wt. % salt (or 0.0034 wt. % based on sodium).

The described desalting process consisting of two extraction steps resulted in a desalting degree of 96.7%.

Example 4

The process was conducted in the same manner as in Example 2, except that benzene was used as a parting agent. Upon the extraction and cumene take-off, the PPW contained 0.0130 wt. % salt (or 0.0042 wt. % based on sodium).

The described desalting process consisting of two extraction steps resulted in a desalting degree of 95.9%.

Example 5

The process was conducted in the same manner as in Example 2, except that the desalting area consisted of one extraction step and the PPW to cumene to aqueous salt solution was maintained at 1:0.5:0.5. Upon the extraction and cumene take-off, the PPW contained 0.0653 wt. % salt (or 0.0211 wt. % based on sodium).

The described desalting process consisting of one extraction step resulted in a desalting degree of 79.6%.

Example 6

The process was conducted in the same manner as in Example 2, except that fresh water was used as an extractant in the second extraction step. The PPW to cumene to water was maintained at 1:0.5:0.5. Upon the extraction and cumene take-off, the PPW contained 0.006 wt. % salt (or 0.0019 wt. % based on sodium).

The described desalting process consisting of two extraction steps resulted in a desalting degree of 98.1%.

Example 7

The process was conducted in the same manner as in Example 6, except that the salt content in the PPW was 1.2 wt. %. Upon the extraction and cumene take-off, the PPW contained 0.024 wt. % salt (or 0.0078 wt. % based on sodium).

The described desalting process consisting of two extraction steps resulted in a desalting degree of 98%.

Example 8

The process was conducted in the same manner as in Example 2, except that the sodium sulfate content in the aqueous salt phase was 0.25 wt. %. Upon the extraction and cumene take-off, the PPW contained 0.0045 wt. % salt (or 0.0015 wt. % based on sodium).

The described desalting process consisting of two extraction steps resulted in a desalting degree of 98.6%.

Example 9

The process was conducted in the same manner as in Example 6, except that the PPW were directed to the desalting area which consisted of a countercurrent extraction column having two theoretical extraction steps. Upon the extraction and cumene take-off, the PPW contained 0.007 wt. % salt (or 0.0024 wt. % based on sodium).

The described desalting process carried out in the countercurrent extraction column resulted in a desalting degree of 97.8%.

Example 10

(Comparative by Prototype) in Accordance with Russian Pat. No. 2057746)

Phenol tar containing 10.33 wt. % phenol, 12.39 wt. % acetophenone, 2.51 wt. % DMBA, 30.56 wt. % para-cumylphenol, 22.42 wt. % AMS dimers, 9.51 wt. % unknown, and 12.15 wt. % heavy condensation products, and having a salt content of 0.32 wt. % (0.104 wt. % sodium ions) was subjected to a single extraction. The tar to DIPE to water mass ratio was 1:0.9:0.6. The extraction temperature was 60° C. After agitating violently by a stirring bar for 10 min, the resulting mixture was left for complete layering and was separated into an ether-tar phase and an aqueous salt phase. When the ether was removed the salt content was 0.0410 wt. % (or 0.0132 wt. % based on sodium).

The desalting degree was 87.0%.

Thus, while there have shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A desalting method for extracting salt from phenol production waste of a phenol process, comprising the steps of:
   (a) receiving said phenol production waste from the phenol process;
   (b) providing a parting agent operable to separate, on contact, an organic material into an organic phase and an aqueous phase;
   (c) providing an extractant operable, on contact, to absorb salt into an aqueous phase, wherein said extractant comprises an aqueous $NaHSO_4$ solution;
   (d) performing at least one sequential extraction step, in at least one corresponding sequential extraction system, on said phenol production waste, to extract salt therefrom, each said at least one sequential extraction step comprising the steps of:
      (1) bringing said phenol production waste, said parting agent, and said extractant into contact with one another to form an extraction product comprising a separate organic phase and a separate aqueous salt phase;
      (2) during said step (d)(1), maintaining a pH of said aqueous salt phase within a range sufficient to avoid formation of free acid, and to avoid formation of a third phase, and
      (3) removing said aqueous salt phase from said extraction product to produce a desalted product, and, when said at least one sequential extraction step comprises a plurality of sequential extraction steps, delivering said desalted product to a next sequential extraction step to repeat steps (d)(1) to (d)(3) to increase a degree of desalting of said desalted product,
   wherein the parting agent is cumene.

2. The desalting method of claim 1 further comprising the step of:
   (e) after said step (d), removing said parting agent from said organic phase by fractionation.

3. The desalting method of claim 2 further comprising the step of:
   (f) after said step (e), recycling said removed parting agent to said at least one extraction system for utilization during performance of said at least one extraction step.

4. The desalting method of claim 1, wherein said pH range is above about 1, and below 7 and is sufficient to maintain a sodium ion content in said phenol production waste of about 1 ppm to about 500 ppm, each of said values being adjusted by a quantity of said at least one extraction step.

5. The desalting method of claim 1, wherein said parting agent has a boiling point below 180° C.

6. The desalting method of claim 1, wherein said step (d) is conducted at a temperature between about 5° C. to about 95° C.

7. The desalting method of claim 1, wherein said step (d) is conducted at a mass ratio of said phenol production waste to said extractant, of about 1:0.1 to about 1:2.

8. The desalting method of claim 1, wherein said step (d) is conducted at a mass ratio of said phenol production waste to said parting agent, of about 1:0.05 to about 1:1.5.

9. The desalting method of claim 1, wherein said step (d)(3) further comprises the step of:
   (g) continuously recirculating said aqueous salt phase to said at least one extraction system.

10. The desalting method of claim 1, wherein a $NaHSO_4$ concentration in said aqueous salt phase does not exceed a limit of salt solubility in water at a temperature at which said step (d) is being conducted.

11. The desalting method of claim 2, further comprising the step of:
    (h) after said step (e), recirculation said parting agent removed by said fractionation to said at least one extraction system.

12. The desalting method of claim 1, wherein said step (d)(1) further comprises the step of:
    (i) mixing, by a first mixing system, said phenol production waste, said parting agent, and said extractant.

13. The desalting method of claim 12, wherein said step (d)(2) further comprises the step of:
    (j) separating, in a first settler system, immiscible phases produced at said step (i).

14. The desalting method of claim 13, said first mixing system and said first settler systems are separate sequential units.

15. The desalting method of claim 13, said first mixing system and said first settler systems are integrated into one unit.

16. The desalting method of claim 1, wherein said step (d)(2) further comprises the step of:
    (k) mixing, by a second mixing system, said phenol production waste, said parting agent, and said extractant.

17. The desalting method of claim 16, wherein said step (d)(2) further comprises the step of:
    (l) separating, in a second settler system, immiscible phases produced at said step (k).

18. The desalting method of claim 17, said second mixing system and said second settler systems are separate sequential units.

19. The desalting method of claim 17, said second mixing system and said second settler systems are integrated into one unit.

20. The desalting method of claim 1, wherein said phenol production waste comprises a byproduct of technical grade cumene hydroperoxide cleavage—phenol tar.

21. The desalting method of claim 1, wherein said phenol production waste comprises aromatic derivatives formed during an AMS hydrogenation stage, or during a target AMS production stage.

22. The desalting method of claim 1, wherein said phenol production waste comprises phenol tar and aromatic derivatives at a mass ratio of about 1:0.001 to about 1:2, respectively.

23. The desalting method of claim 1, further comprising the step of:
    (m) wherein when said at least one extraction step comprises a plurality of extraction steps, feeding said phenol production waste and said extractant in a countercurrent manner to minimize consumption of water during performance of said step (d).

24. The desalting method of claim 1, wherein said step (d) is performed in a countercurrent extraction column.

25. The desalting method of claim 1, further comprising the step of:
(n) wherein, when said at least one extraction step comprises a plurality of sequential extraction steps performed in a corresponding plurality of extraction systems, feeding and utilizing at least one different, from said extractant utilized at a first plural extraction system, extractant at a second and subsequent plural extraction systems.

26. The desalting method of claim 25, wherein one of said extractant and said at least one different extractant, is an aqueous salt solution, and wherein the other one of said extractant and said at least one different extractant, is water.

27. The desalting method of claim 1, wherein the phenol process comprises a neutralization stage, and wherein said step (d) (3) further comprises the step of:
(o) directing at least a portion of said removed aqueous salt phase to the neutralization stage.

28. The desalting method of claim 1, wherein the phenol process comprises a waste disposal system, and wherein said step (d) (3) further comprises the step of:
(p) directing at least a portion of said removed aqueous salt phase to the waste disposal system.

29. The desalting method of claim 1, wherein when said at least one extraction step comprises a plurality of sequential extraction steps performed in a corresponding plurality of extraction systems, said step (c) further comprises the step of:
(q) providing a first extractant to each of said plural sequential extraction systems, except for a last sequential extraction system, and;
(r) providing a second extractant to said last sequential extraction system.

30. The desalting method of claim 29, wherein said first extractant is an aqueous salt solution, and wherein said second extractant is water.

31. The desalting method of claim 1, wherein when said at least one extraction step comprises a plurality of sequential extraction steps performed in a corresponding plurality of extraction systems, said step (d) (3) further comprises the step of:
(s) continuously recirculating said aqueous salt phase to each of said plural sequential extraction systems, except for a last sequential extraction system, and;
(t) delivering water to said last sequential extraction system, for use as extractant, to maximize said desalting degree.

32. The desalting method of claim 31, wherein a quantity of said water delivered at said step (t) is at a mass ratio to a combination of quantities of said phenol production waste and said parting agent of about 0.01:1 to about 0.5:1.

33. The desalting method of claim 1, wherein a number of said at least one extraction steps and said corresponding at least one extraction system, to be used at said step (d) is selected in accordance with at least one parameter selected from a group of: a first salt content level in said phenol production waste received at said step (a); a specific requirement of a maximum permissible salt concentration value of said desalted product, a phenol production waste to extractant to parting agent mass ratio, a second salt content level in the extractant, and an operational efficiency of each said at least one extraction system.

* * * * *